(12) United States Patent
Yi (10) Patent No.: US 12,280,816 B2
(45) Date of Patent: Apr. 22, 2025

(54) STROLLER, STROLLER FRAME AND FOLDING DEVICE THEREOF (71) Applicant: WONDERLAND SWITZERLAND AG, Steinhausen (CH)

(72) Inventor: Xiaolong Yi, Dongguan (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 300 days.

(21) Appl. No.: 17/719,209

(22) Filed: Apr. 12, 2022

(65) Prior Publication Data
US 2022/0324502 A1 Oct. 13, 2022

(30) Foreign Application Priority Data

Apr. 13, 2021 (CN) .......................... 202120755431.4

(51) Int. Cl.
*B62B 7/06* (2006.01)
*B62B 9/08* (2006.01)

(52) U.S. Cl.
CPC ................ *B62B 7/06* (2013.01); *B62B 9/085* (2013.01)

(58) Field of Classification Search
CPC ........... B62B 7/06; B62B 7/064; B62B 9/085; B62B 2205/20
See application file for complete search history.

(56) References Cited

U.S. PATENT DOCUMENTS

| 6,991,248 | B2 * | 1/2006 | Valdez | ...................... B62B 7/08 280/658 |
| 7,584,985 | B2 * | 9/2009 | You | .......................... B62B 7/06 280/47.38 |
| 9,216,755 | B2 * | 12/2015 | Eisinger | .................. B62B 5/065 |

(Continued)

FOREIGN PATENT DOCUMENTS

| CN | 201255162 Y | | 6/2009 |
| CN | 201675507 U | * | 12/2010 |
| CN | 102009680 A | | 4/2011 |

(Continued)

OTHER PUBLICATIONS

Taiwanese Office Action issued in corresponding Taiwanese Application No. 111113771, dated Dec. 8, 2022, pp. 1-25.

(Continued)

*Primary Examiner* — Steve Clemmons
(74) *Attorney, Agent, or Firm* — HAUPTMAN HAM, LLP (57) ABSTRACT

A folding device of a stroller includes a folding assembly which is configured to fold the stroller and a safety assembly. The folding assembly includes an operable pull handle. The pull handle is slidably sleeved over a handle frame of the stroller and is movable between a holding position and a release position. The safety assembly is configured to cooperate with the folding assembly, in which the safety assembly includes a locking member for preventing misoperation of the pull handle, and the locking member is switchable between a locked position and an unlocked (Continued)

position. The locking member is configured to prevent the pull handle from moving to the release position responsive to the locking member being in the locked position; and the locking member is entirely located inside the handle frame responsive to the locking member being in the unlocked position.

3 Claims, 11 Drawing Sheets

(56) References Cited

U.S. PATENT DOCUMENTS

| | | | | |
|---|---|---|---|---|
| 10,286,941 | B2 * | 5/2019 | Li | B62B 7/062 |
| 2004/0075247 | A1 | 4/2004 | Lin | |

FOREIGN PATENT DOCUMENTS

| | | | | | |
|---|---|---|---|---|---|
| CN | 202130474 | U | * | 2/2012 | |
| CN | 202345739 | U | | 7/2012 | |
| CN | 202608849 | U | * | 12/2012 | |
| CN | 103661551 | A | | 3/2014 | |
| CN | 205381293 | U | | 7/2016 | |
| CN | 108327770 | A | * | 7/2018 | ............. B62B 7/083 |
| CN | 109895835 | A | | 6/2019 | |
| CN | 212500618 | U | * | 2/2021 | |
| DE | 102013107139 | A1 | * | 1/2015 | ............. B62B 7/066 |
| WO | WO-2012027795 | A1 | * | 3/2012 | ................ B62B 7/06 |

OTHER PUBLICATIONS

Taiwanese Office Action issued in corresponding Taiwanese Application No. 111113771, dated Feb. 26, 2024, pp. 1-61.
Office Action in Corresponding Taiwan Application No. TW111113771, dated Oct. 14, 2024; 6 pgs.

* cited by examiner

STROLLER, STROLLER FRAME AND FOLDING DEVICE THEREOF

CROSS-REFERENCE TO RELATED APPLICATION

The application claims priority to Chinese Patent Application No. 202120755431.4, filed on Apr. 13, 2021, the content of which is incorporated herein by reference in its entirety.

TECHNICAL FIELD

This disclosure relates to the stroller field and in particular to a stroller, a stroller frame and a folding device thereof.

BACKGROUND

In order to facilitate the carrying and storage of a stroller, the stroller usually has a folding function, so as to be folded when not in use, thereby reducing occupied space. An existing folding technology is to realize the folding function of the stroller through a folding device.

SUMMARY

An aspect of the present disclosure provides a folding device of a stroller, including: a folding assembly configured to fold the stroller, the folding assembly including an operable pull handle, the pull handle being slidably sleeved over a handle frame of the stroller and being movable between a holding position and a release position; and a safety assembly configured to cooperate with the folding assembly, the safety assembly including a locking member for preventing misoperation of the pull handle, the locking member being switchable between a locked position and an unlocked position, wherein, the locking member is configured to prevent the pull handle from moving to the release position when the locking member is in the locked position, and wherein the locking member is entirely located inside the handle frame when the locking member is in the unlocked position.

Another aspect of the present disclosure provides a stroller frame, including the above folding device.

Yet another aspect of the present disclosure provides a stroller, including the above stroller frame.

The details of one or more embodiments of the disclosure are set forth in the accompanying drawings and the description below. Other features, objects and advantages of the present disclosure will become apparent from the description, drawings and claims.

BRIEF DESCRIPTION OF THE DRAWINGS

In order to illustrate technical solutions of the embodiments of the present disclosure more clearly, the following briefly introduces the accompanying drawings used in the description of the embodiments. Obviously, the accompanying drawings in the following description are only some embodiments of the present disclosure. For those skilled in the art, drawings of other embodiments may also be obtained according to these drawings without any creative effort.

DETAILED DESCRIPTION

In order to make the above objects, features and advantages of the present disclosure more clearly understood, the specific embodiments of the present disclosure are described in detail below with reference to the accompanying drawings. In the following description, numerous specific details are set forth in order to provide thorough understanding of the present disclosure. However, the present disclosure may be implemented in many ways different from those described here, and those skilled in the art may make similar improvements without violating the connotation of the present disclosure. Therefore, the present disclosure is not limited to the specific embodiments disclosed below.

In the description of the present disclosure, it should be understood that there may be terms such as "center", "longitudinal", "lateral", "length", "width", "thickness", "upper", "lower", "front", "back", "left", "right", "vertical", "horizontal", "top", "bottom", "inside", "outside", "clockwise", "counterclockwise", "axial", "radial", "circumferential" and other indicated orientations or positional relationships are based on the orientations or positional relationships shown in the accompanying drawings, and are only for the convenience of describing the present disclosure and simplifying the description, rather than indicating or implying that the device or element referred to must have a specific orientation, be constructed and operate in a specific orientation, and therefore should not be deemed as a limitation of the present disclosure.

In the present disclosure, unless otherwise expressly specified and limited, terms such as "installation", "link", "connection", "fixation", "arrangement" and the like should be interpreted in a broad sense. For example, unless otherwise expressly defined, a "connection" may be a fixed connection, a detachable connection, or formed integrally; it may be a mechanical connection or an electrical connection; it may be a direct connection or an indirect connection through an intermediate medium. The connection may be an internal communication of the two elements or an interaction relationship of the two elements. As another example, when an element is referred to as being "fixed to" or "disposed to" another element, it may be directly on the other element or intervening elements may also be present. For those skilled in the art, the specific meanings of the above terms in the present disclosure may be understood according to specific situations.

In the present disclosure, unless otherwise expressly specified and defined, a first feature being "on" or "under" a second feature may mean that the first feature and the second feature are in direct contact, or the first feature and the second feature are indirect contact through an intermedium. Also, the first feature being "above", "over" and "on top of" the second feature may mean that the first feature is directly above or obliquely above the second feature, or simply means that the first feature is level higher than the second feature. The first feature being "under", "below" and "neath" the second feature may mean that the first feature is directly below or obliquely below the second feature, or simply means that the first feature has a lower level than the second feature.

The inventors noted that an existing foldable stroller may be brought into a collapsible state by operating a pull handle. In this collapsible state, the stroller may be collapsible and folded, e.g., a part of a stroller frame is rotatable. However, the pull handle of the existing stroller may be misoperated, which may cause the stroller to be into an unstable state and foldable during use, and may endanger the safety of a baby or a child in the stroller.

According to some embodiments of the present disclosure, an aspect of the present disclosure provides a folding device of a stroller. The folding device includes a folding assembly for folding the stroller and a safety assembly that cooperates with the folding assembly. The folding assembly includes a pull handle for operation. The safety assembly includes a locking member for preventing misoperation of the pull handle.

An existing pull handle in the art may be at risk of being misoperated by a user or accidentally operated by an external force, causing the stroller to enter an unstable state and be foldable, thereby bringing a safety hazard to the baby in the stroller. In the present disclosure, by providing the safety assembly with the locking member, the pull handle can be prevented from being misoperated, thereby ensuring the safety of the baby in the stroller.

Figure 1:
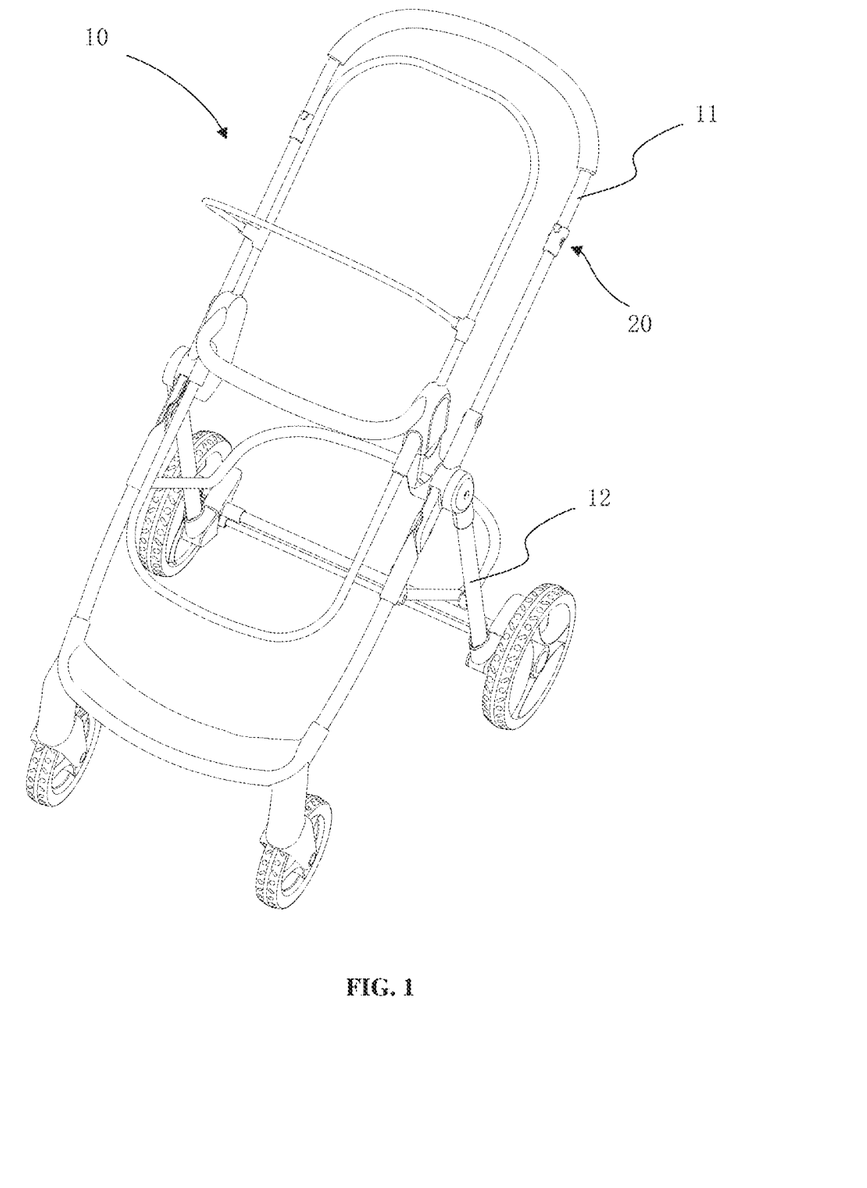
FIG. 1 is a perspective view of a stroller frame according to an embodiment of the present disclosure.
Figure 2:
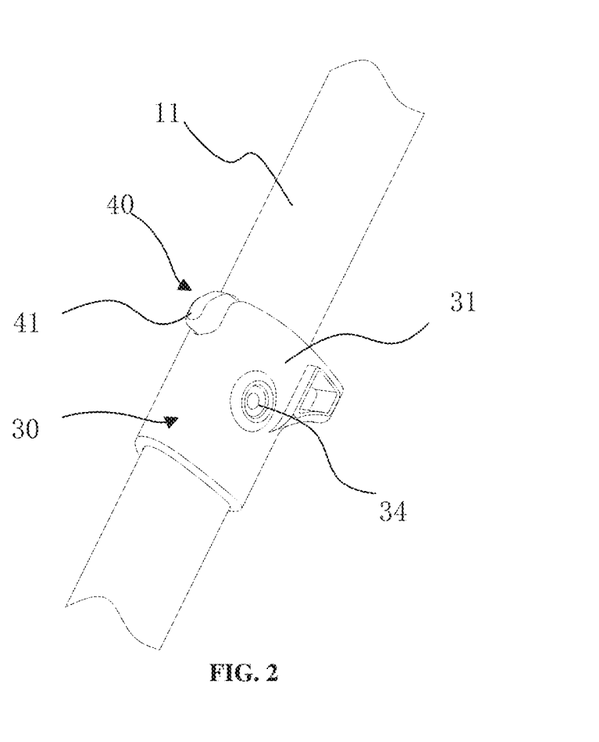
FIG. 2 is a partial perspective view of a folding device according to an embodiment of the present disclosure.
Figure 3:
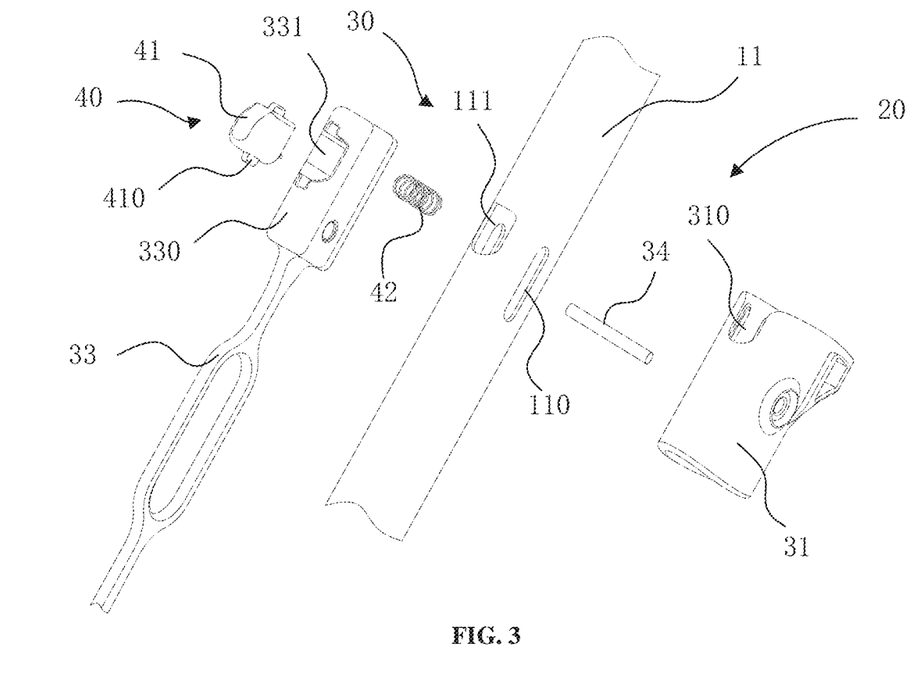
FIG. 3 is a partial exploded view of a folding device according to an embodiment of the present disclosure.
Figure 4:
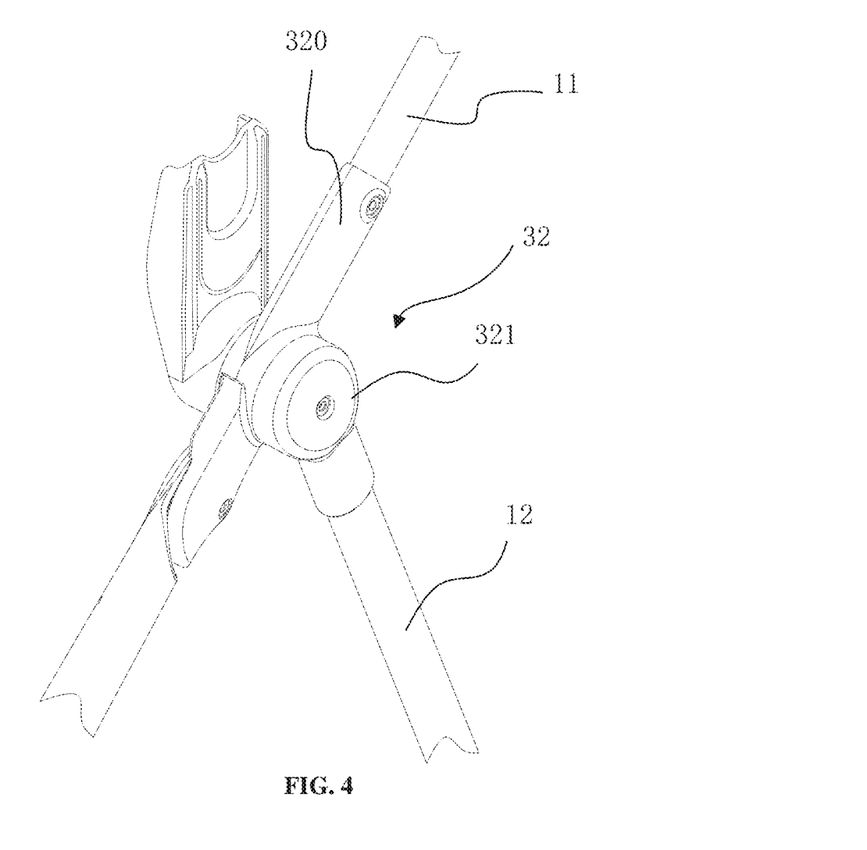
FIG. 4 is a perspective view of a joint assembly according to an embodiment of the present disclosure.

FIG. 1 shows a frame 10 of the stroller according to some embodiments of the present disclosure, and the frame 10 is provided with a folding device 20. Referring to FIG. 2 to FIG. 5, the folding device 20 further includes a folding assembly 30 and a safety assembly 40 for preventing misoperation of the folding assembly 30. Thus, the safety assembly 40 serves as a second lock for the stroller, i.e., the folding assembly 30 as a first lock may be operated to fold the stroller only when the safety assembly 40 is unlocked.

The folding assembly 30 of the present disclosure may adopt various driving manners using a pull handle. Hereinafter, merely some exemplary embodiments will be described below with reference to the accompanying drawings. Referring to FIG. 2 to FIG. 5, the folding assembly 30 includes a pull handle 31, a joint assembly 32 and a pull rod 33 connected between the pull handle 31 and the joint assembly 32. The pull handle 31 is sleeved over a handle frame 11 of the frame 10, and is slidable along the handle frame 11 to move between a holding position and a release position. When the stroller is in normal use, the pull handle 31 is in the holding position, and the frame 10 is relatively immobilized at this time and is unable to be folded. When the pull handle 31 is operated to be in the release position, the joint assembly 32 of the frame 10 is operable, so that the frame 10 is able to be folded. In an example, the folding assembly 30 may further include a reset assembly (not shown), such as a spring. When the pull handle 31 is in the release position, the spring provides a reset force for the pull handle 31, to drive the pull handle 31 to be automatically reset to the holding position. In addition, the pull handle 31 may be reset by the joint assembly 32 (further described later). Obviously, it can be understood that the pull handle 31 may be reset by manual operation.

In one embodiment, the pull handle 31 is connected to the handle frame 11 having a tubular structure by a pin 34, and the handle frame 11 has a chute 110 through which the pin 34 passes and slides. In an example, one end of the pull rod 33 is provided with a connecting end 330 for connecting with the pull handle 31. The pin 34 passes through the connecting end 330, and the connecting end 330 is pulled by the operation of the pull handle 31 and thus slides inside the handle frame 11. The safety assembly 40 is disposed at the connecting end 330, so that the safety assembly 40 may move along with the connecting end 330.

Figure 7:
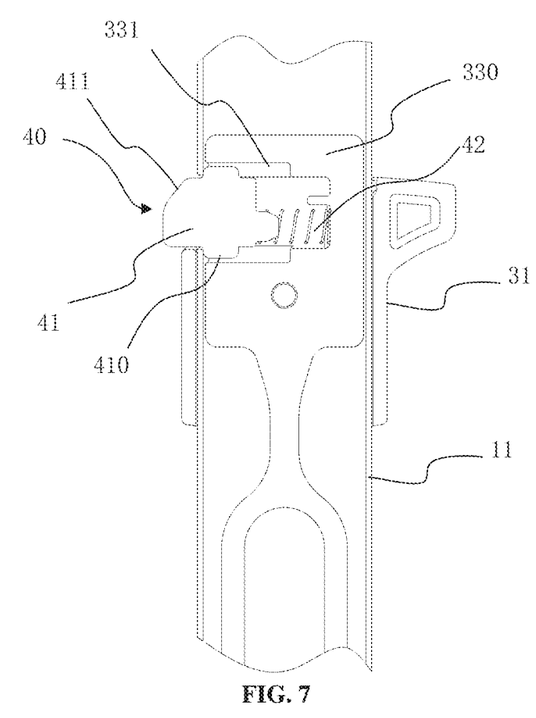
FIG. 7 and FIG. 8 are schematic diagrams for illustrating a folding device according to an embodiment of the present disclosure, where the safety assemblies are in different states.
Figure 8:
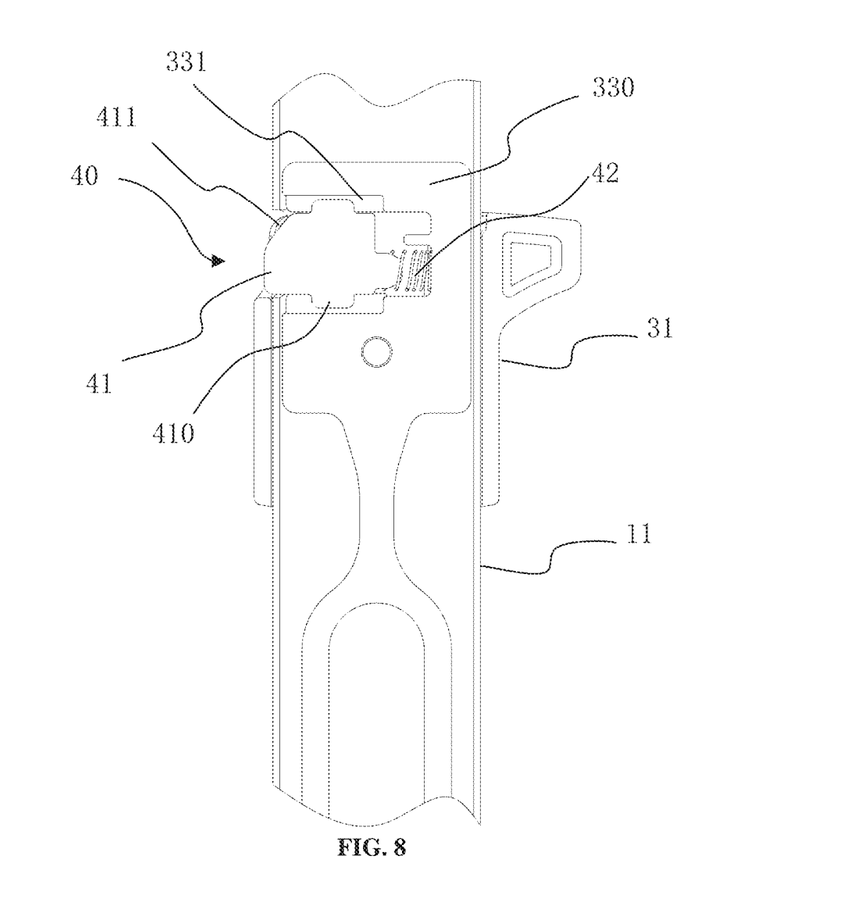

Referring to FIG. 7 and FIG. 8, the safety assembly 40 includes a locking member 41 and an elastic member 42, and the locking member 41 is switchable between a locked position and an unlocked position. When the locking member 41 is in the locked position, the locking member 41 may abut against the pull handle 31 to lock the pull handle 31 and prevent the pull handle 31 from moving along the handle frame 11 to the release position. When the lock 41 is pressed down to the unlocked position by a user, the pull handle 31 is released, so that the pull handle 31 may slide relative to the handle frame 11, thereby activating the joint assembly 32 to place the stroller in a foldable state. When the locking member 41 is in the unlocked position, the locking member 41 may be entirely located inside the handle frame 11 having the tubular structure, and may slide along with the pull handle 31. In this way, the handle frame 11 together with the locking member 41 has a simplified structure, and thus a complicated mechanism for the relative sliding operation is not required. In order to better abut with the locking member 41, the pull handle 31 is provided with a bayonet 310 in a corresponding position, and the locking member 41 is stuck in the bayonet 310 when in the locked position. The elastic member 42 is configured to urge the locking member 41 to automatically return to the locked position when the locking member 41 is released. In an example, the connecting end 330 of the pull rod 33 is provided with a concave accommodating groove 331. The locking member 41 and the elastic member 42 are located in the accommodating groove 331. In this embodiment, the elastic member 42 may be a spring, which abuts against the locking member 41 to apply an elastic force to the locking member 41.

The handle frame 11 has an opening 111, and the opening 111 cooperates with the locking member 41. When the locking member 41 is in the locked position, the locking member 41 is constrained in the opening 111 to lock the pull handle 31. When the locking member 41 is pressed to the unlocked position by the user, the locking member 41 is released from the constraint of the opening 111, so that the locking member 41 may slide inside the handle frame 11 along with the connecting end 330 of the pull rod 33. In an example, the locking member 41 further includes a protrusion 410 located below an edge of the opening 111, to prevent the locking member 41 from being disengaged with the opening 111.

In some embodiments, the locking member 41 is further provided with a guiding inclined surface 411, and the guiding inclined surface 411 cooperates with an edge of the opening 111 to facilitate the movement of the locking member 41 between the locked position and the unlocked position.

Figure 5:
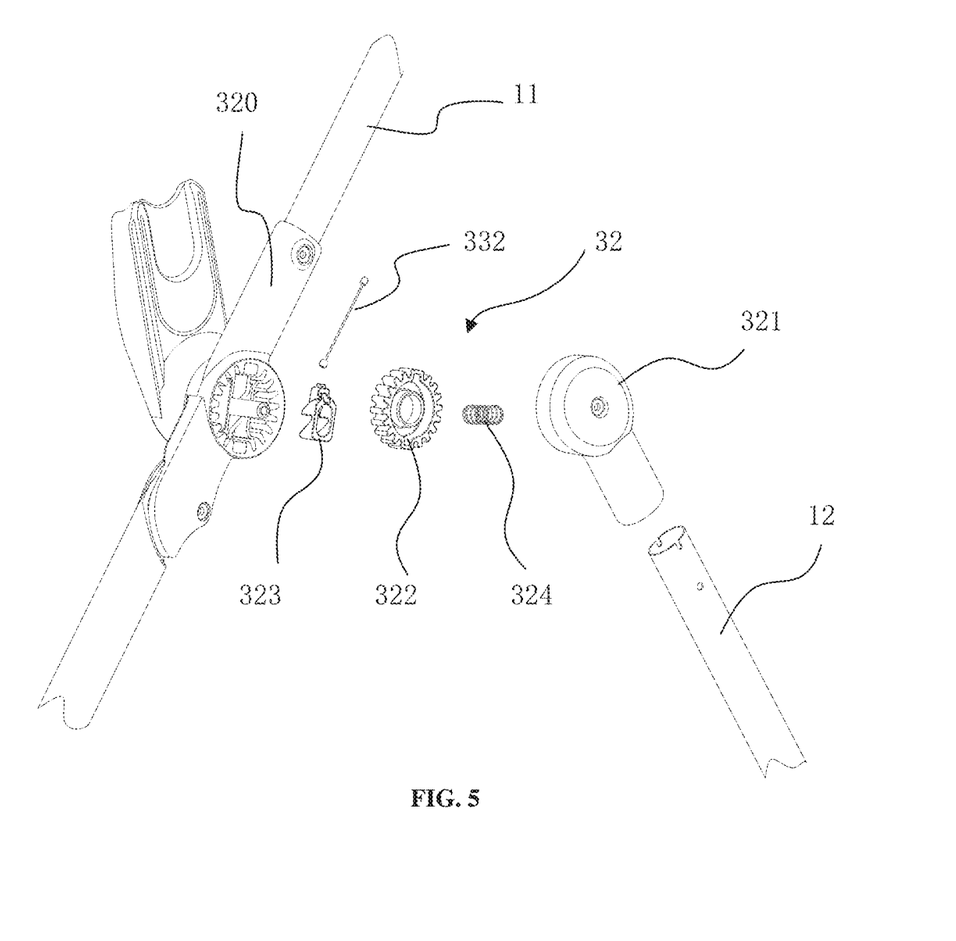
FIG. 5 is an exploded view of the joint assembly of FIG. 4.
Figure 6:
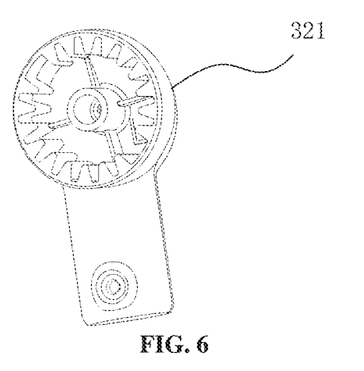
FIG. 6 is a perspective view of a rear leg mount in FIG. 5 from another angle of view.

Referring to FIG. 5 and FIG. 6, the joint assembly 32 includes a handle frame mount 320 for connecting the handle frame 11, a rear leg mount 321 for connecting a rear leg 12 of the stroller, a gear 322 disposed between the handle frame mount 320 and the rear leg mount 321, and a driving member 323 for driving the gear 322. The handle frame mount 320 and the rear leg mount 321 are respectively provided with gear teeth (not indicated) matched with the gear 322. The driving member 323 is connected with the pull rod 33 to drive the gear 322 to move. When the driving member 323 is in a first position, the gear teeth of the handle frame mount 320 and the gear teeth of the rear leg mount 321 are both engaged with the gear 322, so that the rear leg 12 is immobilized relative to the handle frame 11. When the driving member 323 is pulled to a second position by the pulling rod 33, the driving member 323 pushes the gear 322 to be disengaged with the gear teeth of the handle frame mount 320, so that the rear leg 12 is rotatable and foldable relative to the handle frame 11, that is, the folding of the stroller may be realized. Obviously, it can be understood that the driving member 323 may be configured to push the gear 322 to be disengaged from the gear teeth of the rear leg mount 321, so that the rear leg 12 is rotatable relative to the handle frame 11. In an example, the driving member 323 is provided with an inclined surface (not indicated), and correspondingly, the handle frame mount 320 or the rear leg mount 321 is also provided with an inclined surface (not indicated) that matches with the inclined surface of the driving member 323. In this way, when the driving member 323 moves from the first position to the second position, the two inclined surfaces slide relative to each other, so that the driving member 323 pushes the gear 322 laterally and the gear 322 is disengaged with the gear teeth of the handle frame mount 320 (or the gear teeth of the rear leg mount 321). In an example, an elastic member, such as a spring 324, is further provided between the gear 322 and the handle frame mount 320 (or the rear leg mount 321). The spring 324 applies an elastic force to the gear 322 and causes the gear 322 to be reset. In this case, the gear 322 abuts and pushes the driving member 323, to reset the driving member 323 and the pull handle 31 connected with the driving member 323. That is, the pull handle 31 may be reset by the joint assembly 32. In addition, in the embodiment as shown in FIG. 5, the pull rod 33 is connected to the driving member 323 through a steel cable 332 connected thereto. It can be understood that the pull rod 33 may also be directly connected to the driving member 323.

Figure 9:
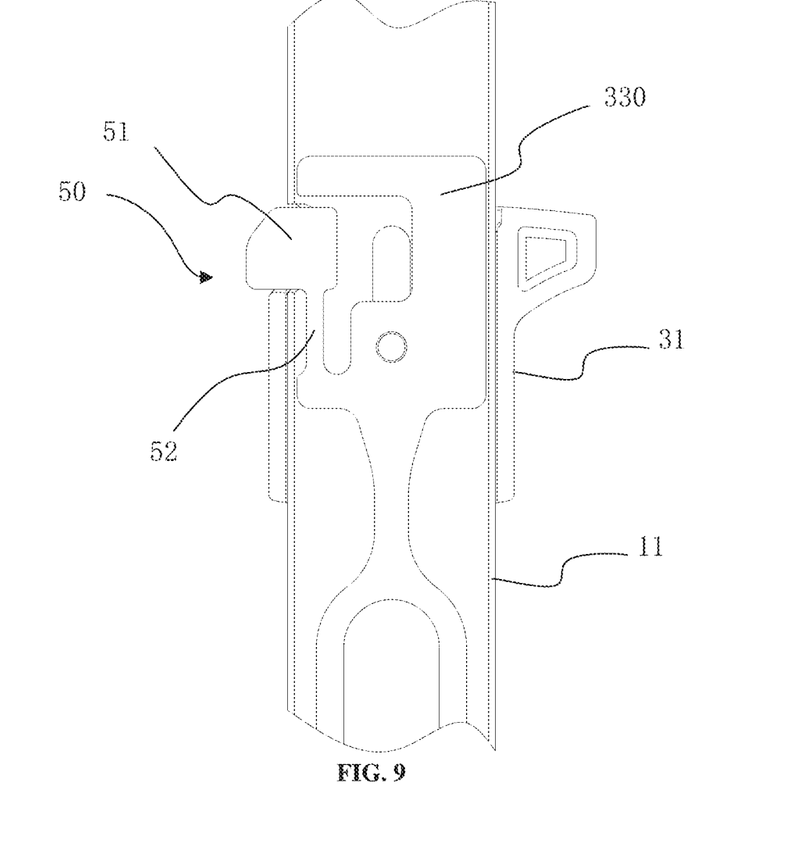
FIG. 9 and FIG. 10 are schematic diagrams for illustrating a folding device according to another embodiment of the present disclosure, where the safety assemblies are in different states.
Figure 10:
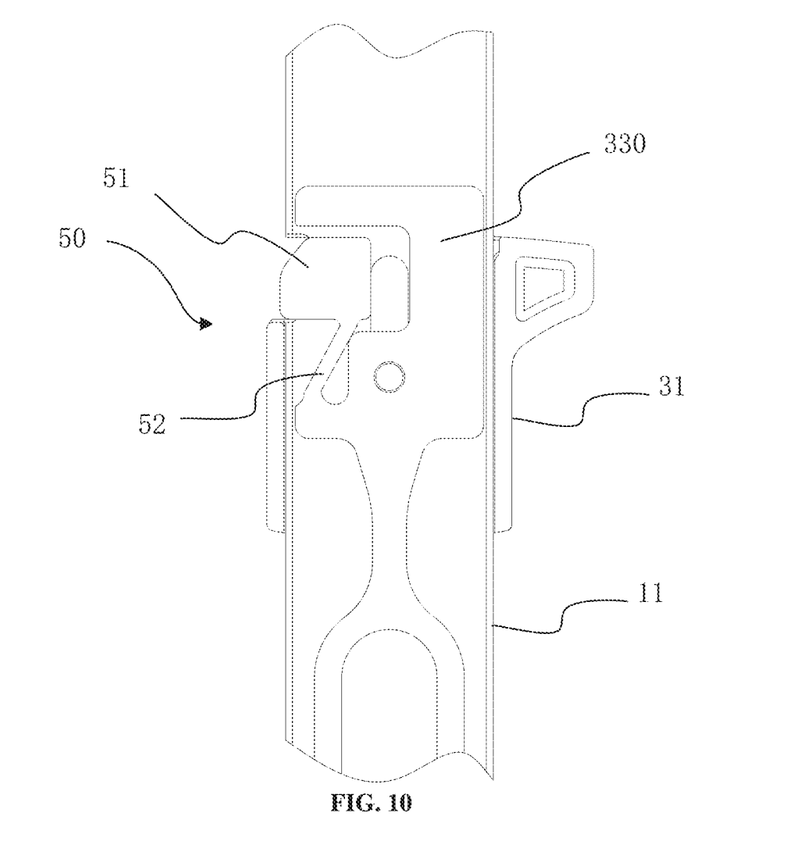

FIG. 9 and FIG. 10 show schematic diagrams of another embodiment of the folding device of the present disclosure. The safety assembly 50 is disposed at the connecting end 330 of the pull rod, and includes a locking member 51 and an elastic member 52. The difference from the previous embodiments is that the elastic member 52 is an elastic arm. One end of the elastic member 52 is connected to the locking member 51, and the other end of elastic member 52 is connected to the connecting end 330 of the pull rod. The locking member 51, the elastic member 52 and the connecting end 330 may be formed integrally. When the locking member 51 is in the locked position as shown in FIG. 9, the locking member 51 prevents the pull handle 31 from sliding along the handle frame 11 to its release position. When the locking member 51 is operated to move to the unlocked position as shown in FIG. 10, the locking member 51 releases the locking of the pull handle 31, so that the pull handle 31 may slide along the handle frame 11 to the release position. In the unlocked position, the elastic member 52 reserves the elastic force for resetting the locking member 51.

Figure 11:
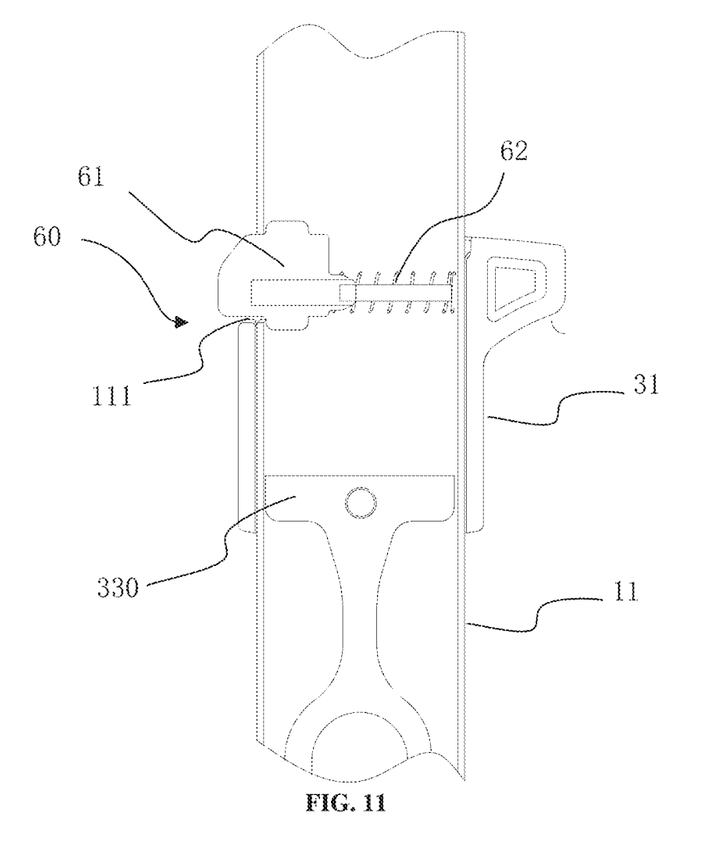
FIG. 11 is a schematic diagram for illustrating a folding device according to another embodiment of the present disclosure.

FIG. 11 is a schematic diagram for illustrating another embodiment of the folding device of the present disclosure. The difference from the previous embodiments is that the safety assembly 60 is directly disposed on the handle frame 11, and includes the locking member 61 and the elastic member 62. The handle frame 11 has an opening 111 that constrains the locking member 61 when the locking member 61 is in the locked position. Therefore, the safety assembly 60 does not move along with the pull rod 33, and the connecting end 330 of the pull rod 33 does not need to accommodate or carry the safety assembly 60. Similarly, when the locking member 61 is in the locked position as shown in FIG. 11, the locking member 61 prevents the pull handle 31 from sliding along the handle frame 11 to the release position. When the locking member 61 is operated to move to the unlocked position, the locking member 61 may be entirely located inside the handle frame 11, and the pull handle 31 may be released, so that the pull handle 31 is slidable along the handle frame 11 to the release position.

In some of the above embodiments, the folding assembly 30 includes the pull handle 31 and the joint assembly 32, and the folding of the frame 10 is realized by driving the joint assembly 32 by the pull handle 31. It can be understood that those skilled in the art may also adopt any other form of the folding assembly, as long as it is operatable by the pull handle to realize the folding function of the frame, and by the concept according to the present disclosure, i.e., the safety assembly serving as a second lock may be implemented thereon. Therefore, the specific structures of the folding assembly described in the above embodiments of the present disclosure do not limit the protection scope of the present disclosure.

Figure 12:
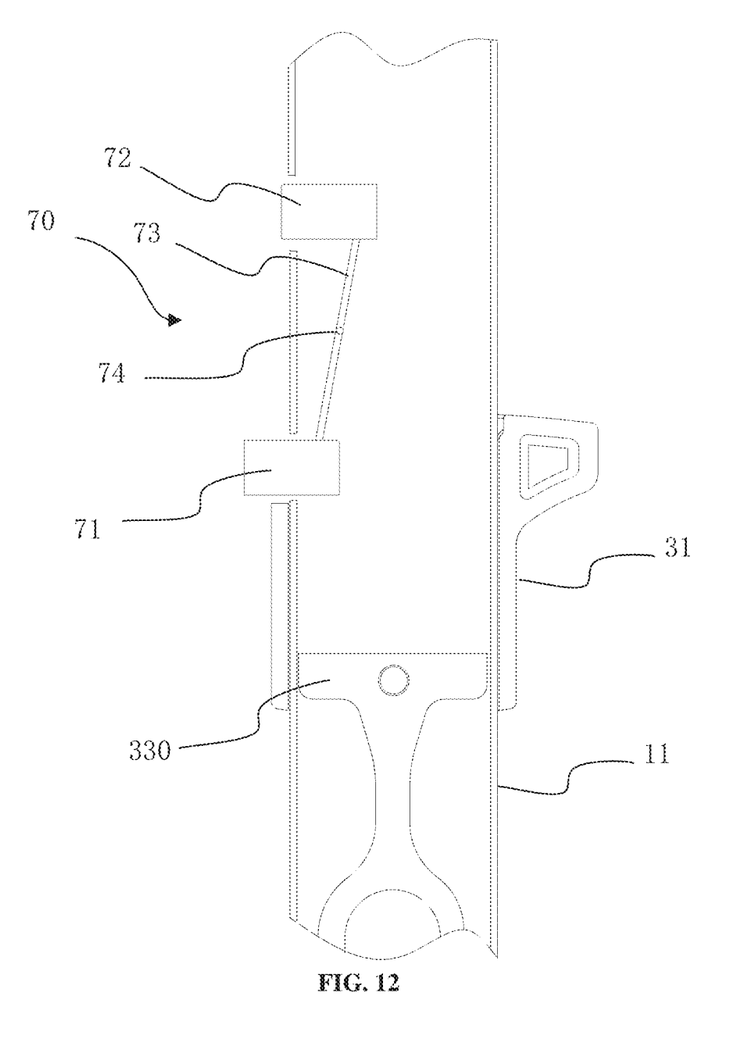
FIG. 12 is a schematic diagram for illustrating a folding device according to another embodiment of the present disclosure.

In some of the above embodiments, the safety assembly 40, 50, 60 includes the locking member 41, 51, 61 and the elastic member 42, 52, 62 for driving and resetting the locking member 41, 51, 61. In other embodiments, the safety assembly may not be provided with an elastic member, but reset the locking member through other mechanical configuration. For example, FIG. 12 shows a schematic diagram of the safety assembly 70 according to another embodiment of the present disclosure. The safety assembly 70 includes a locking member 71, a resetting member 72, and a connecting rod 73 connecting the locking member 71 and the resetting member 72. The connecting rod 73 is fixed to the handle frame 11 by, e.g., a pin 74, and is rotatable about the pin 74, thereby forming a lever structure. The handle frame 11 is provided with openings (not indicated) corresponding to the locking member 71 and the resetting member 72 respectively. When the pull handle 31 needs to be released, the locking member 71 is pressed down, and the resetting member 72 is lifted and disposed in the corresponding opening. In this way, the locking member 71 may be entirely located inside the handle frame 11, and thus the pull handle 31 is movable to the release position. When the pull handle 31 needs to return from the release position to the locked position, the resetting member 72 is pressed down, so that the locking member 71 is lifted and disposed in a corresponding opening to lock the pull handle 31.

According to some embodiments of the present disclosure, another aspect of the present disclosure provides a stroller frame, including the folding device described in any of the above embodiments.

According to some embodiments of the present disclosure, a further aspect of the present disclosure provides a stroller, including the stroller frame described in any of the above embodiments.

According to the folding device provided by the various embodiments of the present disclosure, the safety assembly is provided, so that the pull handle is operated for folding the stroller only when the safety assembly is in the unlocked state. Therefore, the safety assembly serves as a second lock for folding the stroller, so as to prevent the pull handle from being misoperated by the user or other external forces during use, thereby ensuring the safety of the baby or child in the stroller.

The technical features of the above-described embodiments may be combined arbitrarily according to the actual situation. For simplicity, not all possible combinations of the technical features in the above-described embodiments are described. However, as long as the combinations of these technical features do not contradictory, they shall fall within the scope of the description in this specification.

The above-mentioned embodiments merely illustrate several embodiments of the present disclosure, and the descriptions thereof are specific and detailed, but shall not be construed as a limitation to the scope of the disclosure. It should be pointed out that for those skilled in the art, some modifications and improvements may be made without departing from the concept of the present disclosure, which shall all fall within the protection scope of the present disclosure. Therefore, the protection scope of the disclosure shall be limited by the appended claims.

What is claimed is:

1. A folding device of a stroller, comprising:
   a folding assembly configured to fold the stroller, the folding assembly comprising an operable pull handle, the pull handle being slidably sleeved over a handle frame of the stroller and being movable between a holding position and a release position; and
   a safety assembly configured to cooperate with the folding assembly and be not movable along with the pull handle, the safety assembly comprising a locking member and a resetting member connected to the locking member,
   wherein the locking member is switchable between a locked position and an unlocked position, the locking member includes a first portion being operable to drive the locking member to switch from the locked position to the unlocked position,
   wherein the resetting member includes a second portion being operable to drive the locking member to switch from the unlocked position to the locked position,
   wherein when the locking member is in the locked position, the first portion of the locking member is located outside the handle frame to prevent the pull handle from moving to the release position, and
   wherein when the locking member is in the unlocked position, the first portion of the locking member is located inside the handle frame so that an entirety of the locking member is located inside the handle frame to allow the pull handle to move to the release position without the locking member, and the second portion of the resetting member is located outside the handle frame for being operable.

2. The folding device according to claim 1, wherein the safety assembly further includes a connecting rod connecting the locking member and the resetting member, the connecting rod being fixed to the handle frame by a pin and rotatable about the pin, and the locking member, the connecting rod, the resetting member, and the pin form a lever structure.

3. The folding device according to claim 1, wherein the pull handle is provided with a bayonet,
   the first portion is stuck in the bayonet and the second portion is separated from the bayonet responsive to the locking member being in the locked position, and
   the first portion is separated from the bayonet responsive to the first portion being operated and the locking member being in the unlocked position.

* * * * *